U.S. Patent  Aug. 9, 1977  4,040,296
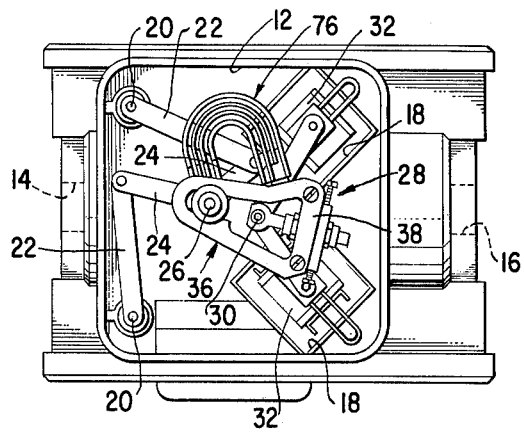
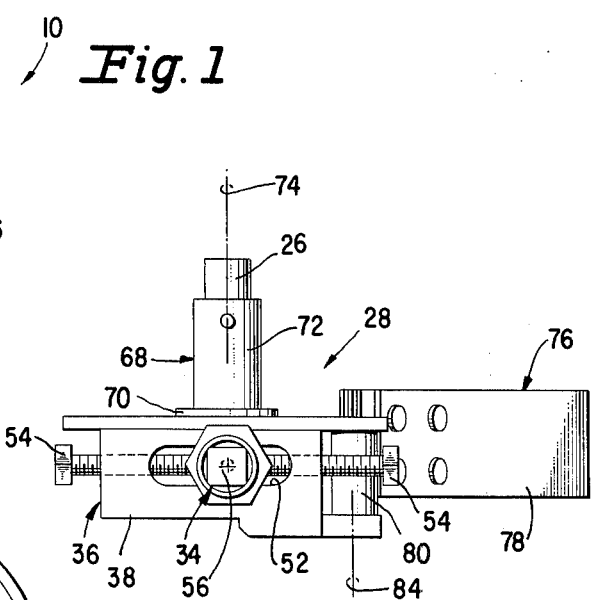
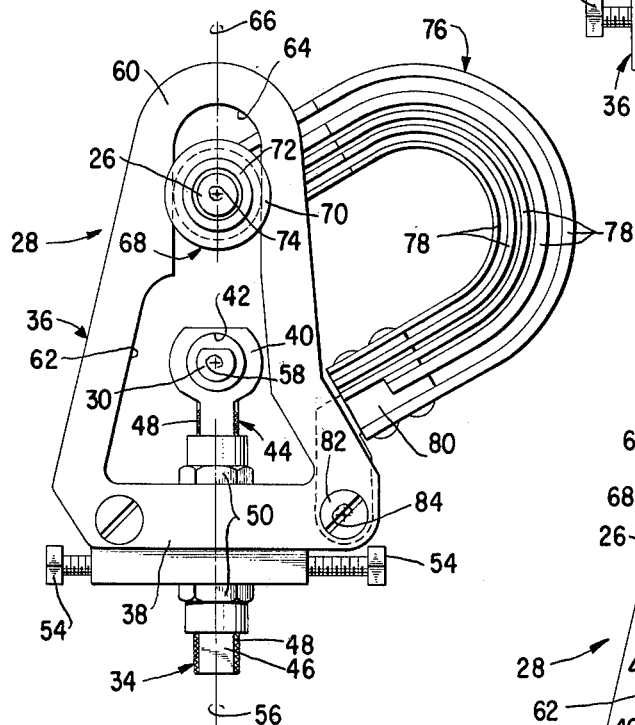
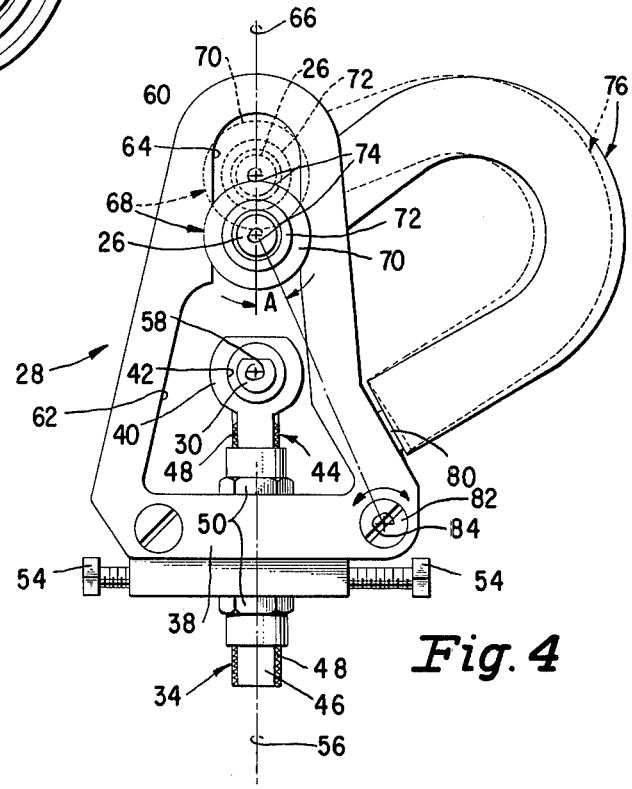
Fig. 1
Fig. 2
Fig. 3
Fig. 4

GAS METER TEMPERATURE COMPENSATING TANGENTS

BACKGROUND OF THE INVENTION

One convenient form of compensation for the change in gas volume due to temperature is to detect the gas flowing temperature and to continuously adjust the meter accuracy such that the read-out reflects the measured volume at a base temperature. However stability of the temperature-correcting systems used in the prior art has been less than perfect, and such systems have often encountered accuracy problems due to binding, hysteresis losses and inaccurate deflection caused by conflicts in the direction of movement of the bi-metal and the tangent block component relative to the position of the crankshaft or the tangent arm journaling the same. Such problems are compounded as the size of the meter increases in that the required deflection also increases, along with the forces.

SUMMARY OF THE INVENTION

It is an object of the present invention to provide a novel gas meter temperature compensating tangent which is an improvement over the prior art; which is simple, economical and reliable; which has a radially rigid guideway which permits accurate deflection due to temperature change in the gas flowing temperature; which uses a tangent block having a radial guideway axially aligned with the tangent arm and in which is disposed a tangent wrist connected to the bi-metal member the other end of which is hinge connected to the tangent block; which uses "U" shaped bi-metal strips having one end hinge connected to the tangent block and the other end connected to the tangent wrist; which uses a roller movably mounted in the radial guideway; and which uses a radial guideway having an axis substantially coincident to or parallel to the axis of the tangent arm.

Other object and advantages will be apparent from the following description of one embodiment of the invention and the novel features will be particularly pointed out hereinafter in the claims.

BRIEF DESCRIPTION OF THE DRAWINGS

This invention is illustrated in the accompanying drawings in which:

FIG. 1 is a top plan view of a gas meter showing the gas distribution chamber in which the present invention is embodied.

FIG. 2 is a top plan view of the gas meter temperature compensating tangent of the present invention, FIG. 3 is a side elevational view of the gas meter temperature compensating tangent of the present invention, FIG. 4 is a top plan view of the gas meter temperature compensating tangent showing the tangent wrist in two positions with the solid line representation depicting a lower gas temperature and dotted line representation depicting a higher gas temperature.

DESCRIPTION OF THE INVENTION

In the illustrated embodiment of the invention a gas meter 10 is shown in FIG. 1 with the cover removed to expose the gas distribution chamber 12 having an inlet at 14 and an outlet at 16. The valve chambers are depicted generally at 18, 18 on the outlet side of the chamer 12, while the flag rods 20, 20 are shown on the inlet side of the chamber 12 at opposite ends thereof. Flag arms 22, 22 are affixed at one end to the flag rods 20, 20 and the other end carry links 24, 24 which each connect to a tangent wrist 26. The tangent wrist 26 is connected to the tangent device, designated generally 28, to which a crankshaft 30 is also connected as described more fully hereinafter to drive the slide valves 32, 32 which controls and synchronized the flow to and from the valve chambers 18, 18 as to measure the thru-put flow of gas from the inlet 14 to the outlet 16.

The tangent device 28 is shown in FIGS. 2 and 3, and in the gas meter art serve to fix the length of the stroke of the flag rods 20, 20 and the timing of the valves 32, 32.

The tangent device illustrated in FIGS. 2 and 3 includes a tangent arm 34 which is mounted for universal adjustment to a tangent block 36 at the base 38 thereof. The tangent arm 34 has a rounded end 40 with a through aperture 42 in which the crankshaft 30 is journaled. A shank 44 having slabbed sides 46 and threaded corners 48 extends from the end 40 to and through the base 38 wherein the tangent arm 34 is connected by means of locking nuts 50 disposed on either side thereof. The base 38 is fitted with a transverse slot seen best in FIG. 3 through which the tangent arm 34 extends to be shifted by a pair of timing-adjustment screws 54 within the slot 52. The tangent arm 34 has an axis 56 which substantially intersects the axis 58 of the crankshaft 30 as illustrated in FIG. 2. Thus, the tangent arm 34 may be shifted along its axis 56 by manipulating the nuts 50, or the axis 56 may be transversely shifted along the base 38 by manipulation of the screws 54. In either case, the crankshaft 30 being journaled by the tangent arm 34 will be likewise shifted relatively with the tangent arm 34. The adjustment of the tangent arm 34 is necessary to obtain the correct registration of the volume of gas. Adjustment of the tangent arm 34 along its axis 56 will change the distance between the tangent wrist 26 and the crankshaft 30, which distance controls the stroke of the gas measuring diaphrams. The transverse shifting of the axis 56 within the slot 52 serves to adjust the angular relationship of the tangent wrist 26 to the crankshaft 30 so as to be control the valve timing. When both the stroke of the tangent wrist 26 and the angular relationship of the tangent wrist 26, relative to the crankshaft 30, are correctly adjusted, the meter 10 will accurately measure the volume of gas.

Another factor to be considered in obtaining an accurate measurement of the quanitity of gas passing through the meter is that the density of the gas varies with temperature. Therefore, change in the density of the gas due to change in temperature must be compensated for. This may be done at the tangent device 28. The present tangent device 28, as shown in FIGS. 2, 3 and 4, will provide for temperature compensation due to changes in gas density or other affects of temperature change such as valve friction and/or diaphram stiffness, and the like.

The tangent block 36 has a guide frame 60 which extends from one side of the base 38 at either end thereof to form a large lower hollow 62, the opening of which is sufficiently large to permit the complete range of adjustments of the tangent arm 34 whether for timing or stroke. A guideway 64 is formed at the end of the guide frame 60 remote from the base 38 and runs inwardly from its outer end to communicate with the hollow portion 62. The guideway 64 has an axis 66 which is substantially perpendicular to the base 38, and e. the guide roller disposed to be continuously shiftable with the guideway formed in the hollow interior of the tangent block.
3. The combination claimed in claim 2 wherein:
a. the bi-metal member having one end pivotally connected to the base of the tangent block on one side of the tangent arm, and the other end thereof connected to the guide roller, and
b. the open end of the "U" shaped bi-metal member substantially facing in the direction of the hollow interior of the tangent block.

* * * * *

United States Patent [19]

Karsmakers et al.

[11] 4,040,297
[45] Aug. 9, 1977

[54] PRESSURE TRANSDUCER

[75] Inventors: Mathijs Antonius Karsmakers; Gerardus Henricus Johannus Somers, both of Eindhoven, Netherlands

[73] Assignee: U.S. Philips Corporation, New York, N.Y.

[21] Appl. No.: 633,286

[22] Filed: Nov. 19, 1975

[30] Foreign Application Priority Data

Dec. 2, 1974    Netherlands ................ 7415668

[51] Int. Cl.² .............................................. G01L 9/06
[52] U.S. Cl. ........................ 73/398 AR; 73/88.5 SD; 73/406; 338/4; 338/42
[58] Field of Search .......... 73/398 AR, 406, 88.5 SD; 338/4, 42, 5

[56] References Cited

U.S. PATENT DOCUMENTS

| 3,457,536 | 7/1969 | Dean et al. | 338/4 |
| 3,513,430 | 5/1970 | Heller | 73/88.5 SD |
| 3,520,191 | 7/1970 | Pien | 73/398 AR |
| 3,568,124 | 3/1971 | Sonderegger | 73/398 AR |
| 3,697,917 | 10/1972 | Orth et al. | 73/398 AR |
| 3,800,264 | 3/1974 | Kurtz et al. | 73/88.5 SD |
| 3,817,107 | 6/1974 | Shimada et al. | 73/398 AR |
| 3,916,365 | 10/1975 | Giachino | 338/5 |

FOREIGN PATENT DOCUMENTS

| 1,248,087 | 9/1971 | United Kingdom | 73/398 AR |

Primary Examiner—Donald O. Woodiel
Attorney, Agent, or Firm—Frank R. Trifari; David R. Treacy

[57] ABSTRACT

A pressure transducer for measuring pressure in a fluid, comprising a pressure-sensitive element which is formed from semiconductor material and bonded over a bore in an insulating holder, through which bore fluid to be measured is passed; and a sealed cap through which connection conductors are led.

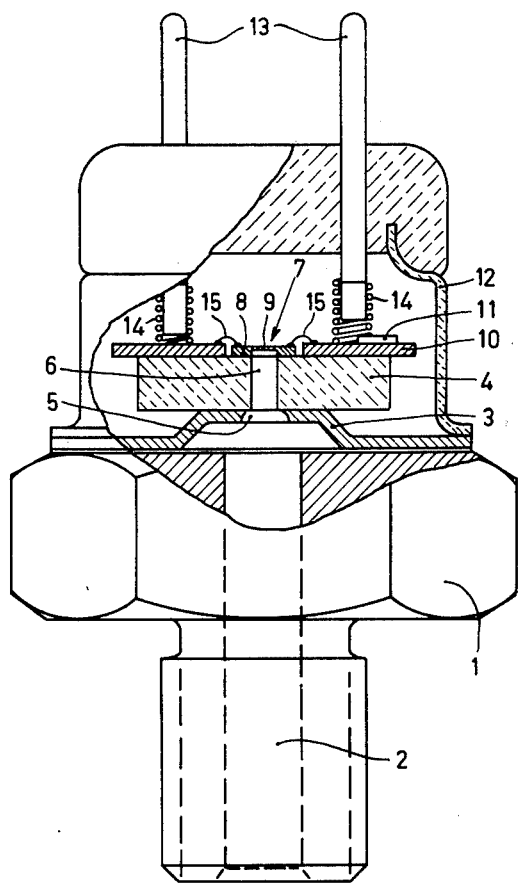

2 Claims, 2 Drawing Figures